J. M. HYDE.
METHOD OF SMELTING ZINC AND OTHER ORES.
APPLICATION FILED MAR. 10, 1915.

1,144,037.

Patented June 22, 1915.

WITNESSES:

INVENTOR,
James M. Hyde,
BY
ATTORNEY

UNITED STATES PATENT OFFICE.

JAMES M. HYDE, OF BERKELEY, CALIFORNIA.

METHOD OF SMELTING ZINC AND OTHER ORES.

1,144,037.           Specification of Letters Patent.      Patented June 22, 1915.

Application filed March 10, 1915. Serial No. 13,377.

*To all whom it may concern:*

Be it known that I, JAMES M. HYDE, a citizen of the United States, residing at Berkeley, in the county of Alameda and State of California, have invented new and useful Improvements in Methods of Smelting Zinc and other Ores, of which the following is a specification.

My invention relates to methods of smelting metal bearing materials containing zinc or any other volatilizable metal or metallic compound, and especially that class of ores containing zinc and other metals such as lead, copper, gold and silver, and has for its object to provide a method by which a continuous smelting operation may be carried on for the recovery of volatilizable metallic substances from materials containing them, and, furthermore, both volatilizable metallic substances and other metallic substances associated or occurring with them, especially that class of ores containing zinc and other metals such as lead, copper, gold and silver, may be recovered in a single continuous smelting operation. This object I attain by smelting the materials containing volatilizable metallic substances in an externally heated retort, which may be fed, either continuously or intermittently, with the material to be treated, and from which may be discharged, either continuously or intermittently, the portion of the charge remaining after the volatilizable metallic substances have been distilled off, and under such conditions that there may be no ingress or egress of gas through the charging device or through the means of removal from the furnace of the portion of the material from which the volatilizable compound has been vaporized for distillation, with the provision of an outlet for the vaporized volatilizable metal and a condenser for its condensation; and in the treatment of those materials containing non-volatile metals which it is desirable to recover, the provision of a smelting chamber into which the residues from the retort are discharged and in which they may be mixed with proper fluxes, and other ore, if desirable, and smelted for the recovery of such metallic values as they may contain.

For the sake of brevity, I shall hereinafter refer to the volatilizable metallic compounds as "zinc" and the substances from which they are to be removed as "ore."

The smelting operation may be carried out in a furnace for which I have filed a copending application, Serial No. 13,376.

Figure 1:
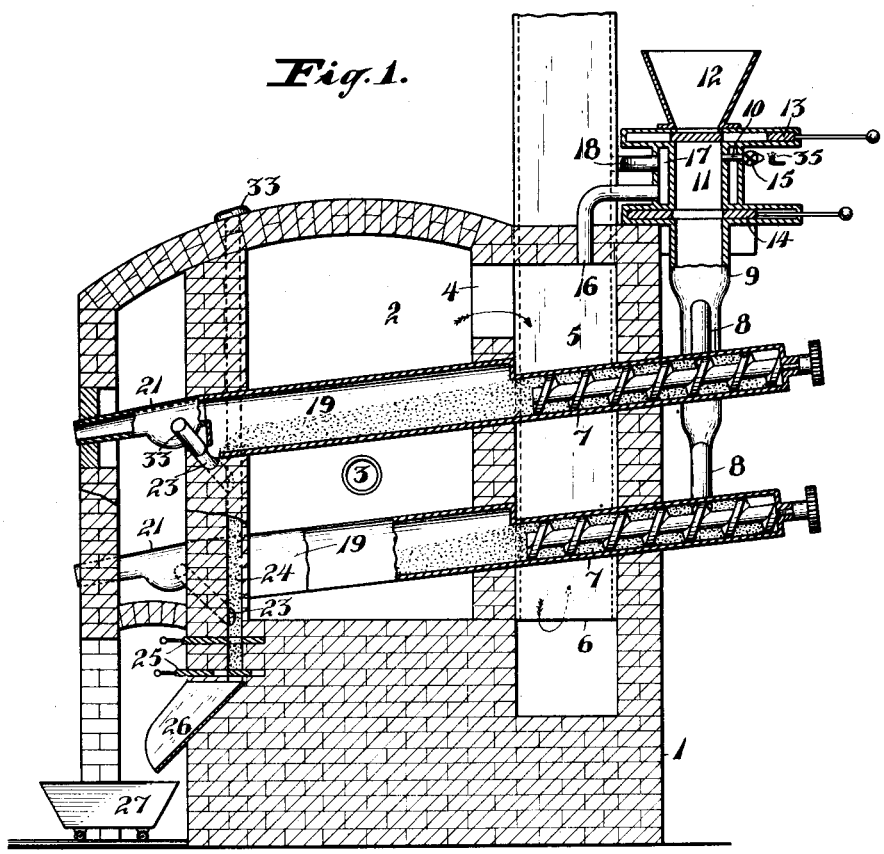
Figure 2:
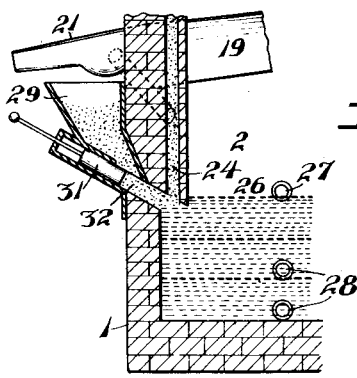

In the accompanying drawings, Figure 1 is a transverse vertical section of a smelting furnace; Fig. 2 is a broken similar view of a modification.

Referring to the drawing, 1 indicates a furnace, having a heating chamber 2 into which fluid or gaseous fuel is supplied by a conduit 3, the products of combustion thereof passing by an opening 4 into a flue chamber 5 and downwardly and longitudinally therein to the bottom of a stack 6 by which they are discharged. Extending across said flue chamber in a direction inclined slightly downward are longitudinal series of feed tubes 7, to the upper portion of which are connected tubes 8, which lead obliquely downward from vertical chutes 9 connected at their upper ends to heating chambers 11, the upper ends of which are connected to hoppers 12. Horizontal gates 13, 14 control the respective passages between the hoppers and the heating chambers and between the heating chambers and the chutes. The zinkiferous or other ore, mixed with proper reducing agents, is fed into the hoppers and admitted therefrom into the heating chambers. From said chambers the air and moisture contained in the ore is expelled through pipes 10 controlled by valves 15 by means of the heat transmitted through the walls of the heating chambers and derived from hot products of combustion allowed to escape from the flue chamber 6 by pipes 16 into annular chambers 17 from which they escape by pipes 18 into the stack. Said feed tubes communicate at their lower ends with smelting vessels or retorts 19, sloping slightly downward and extending across the heating chamber. The vapors of the volatilizable metal contained in the ore escape from said smelting vessels by outlets at their lower ends which communicate with condensers 21 in which the zinc or other volatilizable metals are condensed.

In the wall of the furnace are formed oblique conduits 23, which communicate with the lower ends of the smelting vessels 19, and conduct the liquid contents thereof into vertical conduits 24, by which said contents flow past gates 25 into a chute 26, by which they are discharged into a car 27.

In the modification of the furnace shown in Fig. 2, the vertical conduits 24 lead into a smelting hearth 26, which is here shown as the lower portion of, and continuous with, the chamber 2. The level of the molten material in said smelting hearth 26 is determined by the position of an overflow pipe 27, or by other suitable means. Taps 28 are provided for drawing off the molten material of different densities. A hopper 29 is filled with flux, and a plunger feeder 31 may be drawn back far enough to let the proper amount of flux into a chamber 32, from which, at each forward stroke of the plunger, the flux is discharged with a portion of the residue coming down the conduit 24. The conduits 23 and 24 are continued upward to the outer surfaces of the walls in which they are formed, so that any portions of the residues passing from the smelting vessels which become solid or stick may be pushed down by suitable implements. They are closed at the upper ends by plugs 33. Instead of these conduits, pipes of the proper material may be used inside the heating chamber.

The operation of the process is carried out in the form of furnace shown in Fig. 1 as follows:—The charge of ore mixed with the proper amount of reducing agent, the charge being in either a loose or briqueted condition, is fed through the hopper 12 into the chamber 11 surrounded by the heating chamber 17, the lower gate 14 being closed when the charge is introduced and the upper gate 13 being closed after the chamber 11 has received a portion of the charge. The valve 15 in the pipe 10 is opened and the heat in the heating chamber will evaporate such moisture as is in the charge within the chamber and generate a certain amount of gas from the reducing agent present in the charge (a portion of the reducing agent may consist of soft coal to provide a substance which will readily give off a hydrocarbon gas). The gas generated in the chamber 11 will displace and drive out the air and evaporated moisture. A pilot light 35 may be kept in front of the end of the pipe 10 and the appearance of a flame at the end of this pipe will indicate that air and moisture have been expelled from the chamber and that the interstices of the charge are filled with a combustible gas. The valve 15 may then be closed and the lower gate 14 may then be opened, when the portion of the charge in the chamber 11 will flow into the conduits 9 and 8 leading to the charging devices 7. This operation may then be repeated. The charge in the conduits will be fed by the charging apparatus into the retort at such a rate as to provide for the practically complete distillation of the zinc from the charge during the period in which it is passing through the retort. The residue from which the zinc has been distilled will be discharged through the conduits 23 and 24. Where it is not necessary or desirable to recover any other metallic substances from the residues, they may be discharged to the exterior of the furnace and disposed of as circumstances indicate. Fig. 1 shows a type of furnace adapted for this work, in which the discharging device comprises the gates 25, which may be used to permit of the discharge of the residue without permitting the ingress or egress of gas through the conduits through which the residue is discharged. Any type of discharge apparatus which will permit of the operation of the furnace in such a way that gases may not pass in or out through the channels by which the residues are drawn from the retorts may be used without departing from the spirit of this invention.

When it is desirable to recover other metallic substances from the residues, the type of furnace shown in Fig. 2 may be used, which furnace is designed to permit of the carrying on of the distillation of zinc and the removal of the residues as in the operation already described, save that the residues in a hot and unmolten condition are discharged into a smelting hearth 26 below the muffles in the heating chamber, and means are provided by which flux and any other material which it is desirable to smelt with the residue may be introduced with it into the smelting hearth. Means are also provided by which the products of fusion of the residues, etc., may be drawn off from the furnace together or separately from each other. It may be desirable to have them drawn off into a forehearth, from which they may be drawn off separately as is commonly done in smelting lead ores.

As a substitute method, in order to gain greater capacity of the furnace, the zinc may be only partially vaporized in the retort when a residue is to be smelted for the recovery of other metallic substances, and in such smelting operation the remainder of the zinc will be reduced, vaporized and oxidized by the furnace gases, and may be recovered from the furnace gases by passing the same through a bag house, electrostatic fume arrester or other appropriate device.

Where the material to be treated contains zinc in the form of sulfid, it should receive a preliminary roast, and where the zinc is present as a carbonate, the ore or concentrates should be calcined.

According to present practice, zinc is recovered from its ores by a distillation smelting method which is carried on cyclically in furnaces consisting of a plurality of retorts set in a heating chamber, each retort having an independent condenser. The retorts are charged, the condensers are set in place, the furnace is gradually heated, the temperature being raised until the zinc is distilled from the charge as completely as possible, firing is then stopped, the condensers, from which spelter has been removed at times during the smelting operation, are dismounted, and the residues left in the retorts are discharged. The retorts are again charged and the cycle of operations repeated.

The method is costly in labor, in fuel and in clayware because of the cyclic nature of the operations.

My improved process herein described permits of a continuous operation, mechanically charging and discharging the retorts; the economical utilization of the heat generated by the combustion of the heating fuel; and great economy in the recovery of metals other than zinc from the charge as the residues are, while hot, drawn into the smelting chamber and smelted without the loss of heat and without costly handling.

The smelting chamber will preferably be placed below the retorts, making a self-contained furnace but the spirit of this invention will not be departed from if the residues are removed for smelting outside of the furnace in which they are produced. The residues may be discharged into the smelting hearth above the slag line and the portion of the reducing agent remaining unconsumed may be burned in the smelting chamber.

I claim:—

1. The process of smelting zinkiferous materials which consists in mixing with the zinkiferous material a proper amount of reducing agent, charging the same into a retort while preventing the passage of vaporized zinc through the charging device, vaporizing by external heat the zinc in the retort, and separately removing the vaporized zinc and the solid residues from the retort while continuing the smelting operation, and preventing the passage of gas out of or into the retort through the opening through which the residues are withdrawn.

2. The process of smelting zinkiferous materials which consists in mixing with the zinkiferous material a proper amount of reducing agent, driving out of the prepared charge any air or moisture which it may contain, charging the same into a retort while preventing the passage of vaporized zinc through the charging device, vaporizing by external heat the zinc in the retort, and separately removing the vaporized zinc and the solid residues from the retort while continuing the smelting operation, and preventing the passage of gas out of or into the retort through the opening through which the residues are withdrawn.

3. The continuous process of smelting zinkiferous ores which consists in converting the zinc into zinc oxid by roasting or calcining the crude ore or concentrates, mixing this prepared ore with a proper amount of a reducing agent, driving out of the prepared charge any air or moisture which it may contain, introducing this charge into a retort while sealing the charging aperture against the passage of gas, vaporizing by external heat the zinc in the retort and removing the same therefrom, drawing off the unfused residue from the retort during the smelting operation into a smelting chamber, introducing a proper amount of fluxing materials and utilizing substantially the whole of the heat of the residue to assist in smelting it for the recovery therefrom of its other metallic contents.

4. The continuous process of smelting zinkiferous ores which consists in converting the zinc into zinc oxid by roasting or calcining the crude ore or concentrates, mixing this prepared ore with a proper amount of a reducing agent, driving out of the prepared charge any air or moisture which it may contain, introducing this charge into a retort while sealing the charging aperture against the passage of gas, vaporizing by external heat the zinc in the retort and removing the same therefrom, drawing off the unfused residue from the retort during the smelting operation into a smelting chamber, introducing a proper amount of fluxing materials and utilizing the waste portion of said external heat to assist in smelting the residue for the recovery therefrom of its other metallic contents.

5. The continuous process of smelting zinkiferous ores which consists in converting the zinc into zinc oxid by roasting or calcining the crude ore or concentrates, introducing this charge into a retort while sealing the charging aperture against the passage of gas, vaporizing by external heat part of the zinc in the retort, and separately removing the vaporized zinc and the unfused residue, introducing a proper amount of fluxing material, smelting the residue for the recovery therefrom of its metallic contents other than zinc, reducing, vaporizing and oxidizing by the smelting furnace gases the residual zinc ore, and separating from said gases the zinc oxid thus obtained.

6. The continuous process of smelting zinkiferous ores which consists in converting the zinc into zinc oxid by roasting or calcining the crude ore or concentrates, mixing this prepared ore with a proper amount of a reducing agent, introducing this charge into a retort while sealing the charging aperture against the passage of gas, vaporizing by external heat part of the zinc in the retort, and separately removing the vaporized zinc and the unfused residue, introducing a proper amount of fluxing materials, smelting the residue for the recovery therefrom of its metallic contents other than zinc, reducing, vaporizing and oxidizing by the smelting furnace gases the residual zinc ore, and separating from said gases the zinc oxid thus obtained.

7. The continuous process of smelting zinkiferous ores which consists in converting the zinc into zinc oxid by roasting or calcining the crude ore or concentrates, mixing this prepared ore with a proper amount of a reducing agent, driving out of the prepared charge any air or moisture which it may contain, introducing this charge into a retort while sealing the charging aperture against the passage of gas, vaporizing by external heat part of the zinc in the retort, and separately removing the vaporized zinc and the unfused residue, introducing a proper amount of fluxing materials, smelting the residue for the recovery therefrom of its metallic contents other than zinc, reducing, vaporizing and oxidizing by the smelting furnace gases the residual zinc ore, and separating from said gases the zinc oxid thus obtained.

In testimony whereof I have hereunto set my hand in the presence of two subscribing witnesses.

JAMES M. HYDE.

Witnesses:
FRANCIS M. WRIGHT,
D. B. RICHARDS.